Patented June 6, 1933

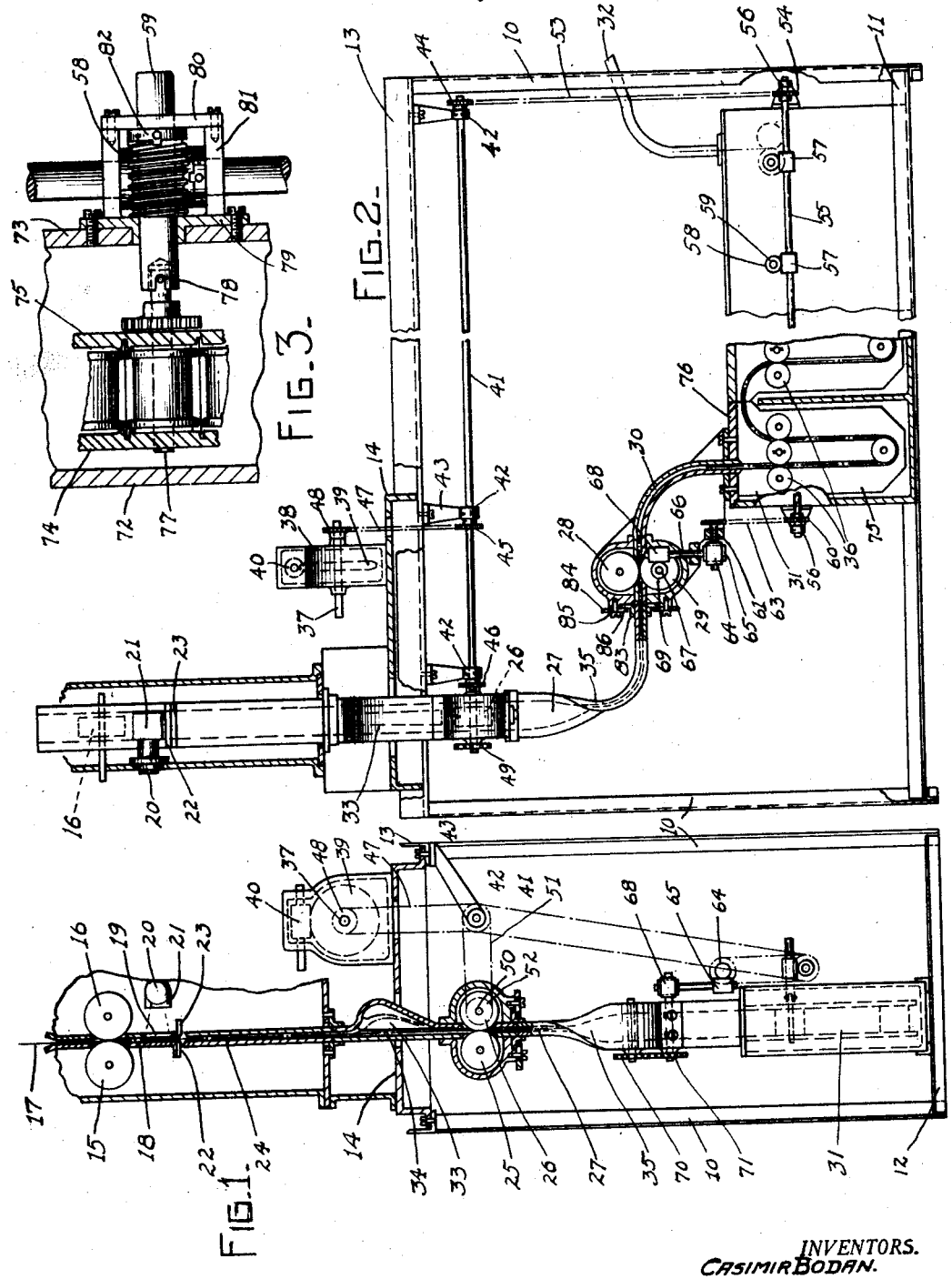

1,912,427

UNITED STATES PATENT OFFICE

CASIMIR BODAN, OF NEW YORK, AND STANLEY J. PASK, OF LONG ISLAND CITY, NEW YORK

PHOTOGRAPHIC AND DEVELOPING APPARATUS

Application filed May 24, 1929. Serial No. 365,601.

This invention relates to an automatic camera and associated developing tank and more particularly to such apparatus in which a strip of sensitized and exposed material is fed from the photographing apparatus to and through a developing apparatus, in a continuous manner.

In a copending application of Casimir Bodan and Stanley J. Pask, Serial No. 211,031, filed August 6, 1927 and entitled Automatic photographing apparatus, we have described an automatic camera which, when set into operation, as by the insertion of a coin or other manipulation, automatically feeds a strip of sensitized photographic material intermittently past a lens system, operates the shutter mechanism while the strip is stationary before the lens and after a predetermined number of exposures have been made, severs the strip and feeds it to a developing apparatus. The developing apparatus comprises a series of tanks containing developing, fixing, washing and drying solutions, through which the strip is conveyed in a continuous manner.

The present invention is concerned with apparatus of this nature, one of the objects being to compensate for variations between the speed of the strip in the photographing apparatus and the developing apparatus.

Another object is to provide convenient arrangement of the developing apparatus relative to the photographing apparatus and to provide means for directing the sensitized strip from the photographing apparatus to the developing apparatus.

Another object of the invention is to obtain coordinated operation of the feeding mechanism for delivering the strip to and through the developing apparatus.

A still further object is to provide a detachable driving connection for the strip feeding mechanism disposed within the developing tank whereby said mechanism may be readily removed.

Other objects and advantages will hereinafter appear.

In order that the invention may be fully understood reference will be had to the accompanying drawing, in which Fig. 1 is a front elevation partly in section, of a portion of the photographing apparatus, the strip feed mechanism and the developing apparatus.

Fig. 2 is a side elevation partly in section, viewed from the right of Fig. 1 and Fig. 3 is a sectional view of a portion of a developing tank and driving mechanism for the strip feeding rollers.

Referring first to Figs. 1 and 2 we have shown a rectangular framework consisting of vertical angle bars 10, lower horizontal side angle bars 11 and end angle bars 12 and upper horizontal side angle bars 13. A horizontal metal plate 14 is bolted or otherwise secured to the angle bars 13 and serves to support the photographing apparatus. Since the photographing apparatus forms no part of the present invention, a fragmentary view only is shown to illustrate the relation of the photographing apparatus to the developing tanks.

As shown the photographing apparatus comprises a pair of feed rollers 15 and 16 which are operated intermittently by mechanism not shown, to feed a strip 17 of sensitized material through the light proof guideway 18. Beneath the feed rolls, the guideway is provided with an aperture 19 through which the image of the person being photographed is projected by a lens 20 and prism 21. The position of the person being photographed is directly to the left of Fig. 2.

A pair of strip severing blades 22 and 23 are mounted below the aperture 19 and are operated by mechanism not shown, to sever the strip 17 after a predetermined number of exposures have been made. The strip, after exposure, is fed through a second guideway 24 to a second pair of feed rollers 25 and 26 by which the strip is fed through a third tubular guideway 27 having a rectangular opening to an additional pair of feed rollers 28 and 29, which in turn feed the strip through a curved guideway 30 into the developing tank 31. From the tank 31 the strip is successively fed through the succeeding washing, fixing and drying tanks and delivered in a finished condition at the rear of the apparatus through the guideway 32.

The distance between each successive pair of feed rollers is less than the total length of the severed strip and in order to prevent tearing of the strip due to the feed rollers 25 and 26 feeding at a slightly faster rate than the feed rolls 15 and 16 and to compensate for the intermittent rotation of these latter rolls, an enlargement 33 is provided in the guideway 24 to temporarily accommodate the slack occurring between the feed rolls 15 and 16 and the feed rolls 25 and 26. A leaf spring 34 is disposed within the compensating chamber 33 and bears against the strip to prevent curling or rolling of the end of the strip as it passes through the chamber.

The guideway 27 is twisted 90 degrees at 35 between the upper and lower ends in order to change the plane of travel of the strip and permit it to be fed into the developing tanks, which extend longitudinally of the rectangular framework. In order to obtain a proper right and left hand image on the sensitized strip, of the object being photographed, the prism 21 is employed to reverse the image formed by the lens.

This necessitates feeding the sensitized strip through the photographing apparatus with the edge towards the front of the apparatus. It is desirable for the sake of compactness to extend the series of developing and finishing tanks longitudinally of the apparatus, as shown in Fig. 2 and this requires that the sensitized strip be twisted 90 degrees in passing from the photographing apparatus to the developing tanks. This is accomplished by the twisted guide channel 35.

The feed rollers 25, 26, 28 and 29 disposed intermediate the camera and developing tank, and the plurality of sets of feed rollers 36 disposed within the tanks, are operated in unison by positive driving connection from the drive shaft 37 mounted within the casing 38. The shaft 37 is driven by a gear 39 and worm wheel 40, from the shaft of the motor which operates the photographing apparatus.

A shaft 41 is mounted in suitable bearing 42 depended from the frame member 13 by brackets 43. Shaft 41 extends substantially the entire length of the frame and is provided with sprocket wheels 44, 45 and 46. Sprocket 45 serves to drive the shaft 41 through a chain 47 and sprocket 48 on the shaft 37. The feed rollers 25 and 26 are geared together by intermeshing gear wheels 49 to the shaft 50 of one of which, the drive shaft 41 is operatively connected by the sprocket chain 51, sprocket 46 and a sprocket 52 on the shaft 50.

The sprocket wheel 44 is connected by chain 53 to a sprocket wheel 54 secured to a shaft 55 rotating in bearings 56 and extending longitudinally of the tanks 31. The shaft 55 is provided with a series of spiral gears 57 which serve to drive the sets of feed rollers 36 through spiral gears 58 secured to shaft 59 extending through each tank.

On the opposite end of shaft 55 from the sprocket wheel 54, is a second sprocket wheel 60 which drives a short shaft 61 having a sprocket wheel 62 through the chain 63. The short shaft 61 is geared by spiral gears 64 and 65 to a vertical shaft 66 which in turn is geared to the drive shaft 67 of the feed roller 29, through the spiral gears 68 and 69. The feed rollers 28 and 29 are driven in unison by gears 70 and 71 mounted on the ends of their shafts. Thus upon operation of the drive shaft 37, the feed rollers for the strip of sensitized material operate in unison to feed the paper to and through the developing tanks at a uniform rate.

In Fig. 3 we have shown the manner in which the feed rollers 36 are operatively connected to the gear shaft 59. In this figure 72 and 73 represent the vertical side walls of the tank and 74 and 75 two spaced parallel plates carried by the cover 76 (Fig. 2) and extending to the base of the tank. The feed rollers 36 are carried by master shafts 77 bearing in the side plates and are positively driven in unison by a train of gears as is fully disclosed in a copending application of Casimir Bodan, Serial No. 223,863, filed October 4, 1927 and entitled Developing apparatus.

The master shaft 77 which controls the operation of all of the feed roller shafts in each tank is driven by shaft 59 by a pin and slot connection 78. The shaft 59 bears in a plate 79 secured in the wall of the tank and a bearing plate 80 carried by a bracket 81 from the plate 79. The plate 80 engages a collar 82 pinned or otherwise rigidly secured to the shaft 59 so as to prevent endwise movement thereof. When it is desired to remove the strip feeding assembly from the tank, as for cleaning or repair, the bearing plate 80 is removed, shaft 59 withdrawn and the entire strip feeding assembly removed with the cover plate 76.

The tubular guideway 27 is removably attached between the casing containing the feed rollers 25 and 26 and the casing for the feed rollers 28 and 29, by means of flanges 83 secured to each end of the guide, which engage under plates 84 secured to the feed roller casings by screws 85 extending through slots 86 in said plates. The slots 86 permits the plates 84 to be shifted from the flange 83.

While we have shown but a single embodiment of our invention it is to be understood that various modifications and changes may be made therein without departing from the invention and we desire the form shown and described not be considered in a limiting sense, except in accordance with the appended claims.

What we claim is:

1. A photographic and developing apparatus comprising a framework, photographic apparatus mounted upon said framework, developing apparatus contained within said framework, means including feed rollers intermediate the photographic and developing apparatus for feeding a strip of sensitized material from said photographic apparatus to said developing apparatus, means including a plurality of feed rollers for feeding said strip through said developing apparatus, and a common positive driving connection between all of said feeding rollers for operating the same in unison.

2. A photographic and developing apparatus comprising a framework, a photograpic apparatus mounted upon said framework, a developing apparatus contained within said framework, means for feeding a strip of sensitized material through said photographic apparatus with the sensitized surface disposed in a plane longitudinally of said framework, means for feeding said strip from said photographic apparatus into said developing apparatus, and guide means intermediate said photographic and developing apparatus for diverting said strip so that its sensitized surface is in a plane transverse to said framework.

3. The combination of a photographic apparatus, a developing apparatus, means for feeding a sensitized strip through the photographic apparatus with the edge thereof disposed towards the front of the photographic apparatus, means for feeding the strip from said photographic apparatus to said developing apparatus comprising a tubular guide having a rectangular opening extending therethrough, the outlet opening of said tubular guide being disposed 90 degrees to the inlet opening whereby the side of the strip is disposed towards the front, the strip extending rearwardly through the developing apparatus.

4. A photographic and developing apparatus comprising a framework, a photograpic apparatus carried thereby, a series of developing tanks spaced from the photographic apparatus, feed rollers within said framework for advancing a strip of sensitized material from the photographic apparatus to said developing tanks, a drive shaft mounted on said frame, a second drive shaft extending across said series of tanks, driving connections between said second drive shaft and each of said tanks and driving connections between said first mentioned shaft and said feed rollers and second driving shaft.

In testimony whereof, we have hereunto subscribed our names this 18 day of May 1929.

CASIMIR BODAN.
STANLEY J. PASK.